US012154733B2

(12) United States Patent
Stumbo et al.

(10) Patent No.: US 12,154,733 B2
(45) Date of Patent: Nov. 26, 2024

(54) TRANSMISSION ASSEMBLY FOR SWITCHBOX

(71) Applicant: General Equipment and Manufacturing Company, Inc., Louisville, KY (US)

(72) Inventors: Briana N. Stumbo, Coal Grove, OH (US); Jason B. Peyton, Louisville, KY (US)

(73) Assignee: General Equipment and Manufacturing Company, Inc., Louisville, KY (US)

( * ) Notice: Subject to any disclaimer, the term of this patent is extended or adjusted under 35 U.S.C. 154(b) by 364 days.

(21) Appl. No.: 17/571,388

(22) Filed: Jan. 7, 2022

(65) Prior Publication Data

US 2023/0096981 A1 Mar. 30, 2023

Related U.S. Application Data

(60) Provisional application No. 63/250,844, filed on Sep. 30, 2021.

(51) Int. Cl.

| | |
|---|---|
| ***H01H 19/14*** | (2006.01) |
| ***H01H 3/42*** | (2006.01) |
| ***H01H 19/62*** | (2006.01) |

(52) U.S. Cl.

CPC .............. *H01H 19/14* (2013.01); *H01H 3/42* (2013.01); *H01H 19/623* (2013.01)

(58) Field of Classification Search

CPC ...... H01H 19/14; H01H 19/11; H01H 19/585; H01H 19/58; H01H 19/62; H01H 19/635;

(Continued)

(56) References Cited

U.S. PATENT DOCUMENTS 4,939,320 A * 7/1990 Graulty .................. H01H 3/166 335/206
6,028,280 A * 2/2000 Winkler ................. H02K 11/28 200/19.03

(Continued)

FOREIGN PATENT DOCUMENTS

CN 1 147 672 C 4/2004
CN 206 647 589 U 11/2017

(Continued)

OTHER PUBLICATIONS

International Search Report and Written Opinion for Application No. PCT/US2022/043932, dated Dec. 19, 2022.

(Continued)

*Primary Examiner* — Ahmed M Saeed
(74) *Attorney, Agent, or Firm* — MARSHALL, GERSTEIN & BORUN LLP

(57) ABSTRACT

A valve controller includes a housing defining an interior volume, and a transmission assembly at least partially disposed in the interior volume of the housing. The transmission assembly includes a shaft coupled to a cam subassembly, which includes a first side and a second side opposite the first side, a first cam, and a second cam coupled to the first cam. Each of the first and second cams includes a bore arranged to receive the shaft and a lobe. The lobe of the first cam and the lobe of the second cam being at least partially coplanar. A first switch and a second switch are disposed in the interior volume of the housing and adjacent to the transmission assembly. The lobe of the first cam is arranged to activate the first switch and the lobe of the second cam is arranged to activate the second switch.

18 Claims, 9 Drawing Sheets

(58) Field of Classification Search
CPC ...... H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01
See application file for complete search history.

(56) References Cited

U.S. PATENT DOCUMENTS

| | | | | | |
|---|---|---|---|---|---|
| 6,087,607 | A * | 7/2000 | Dohnal | H01H 9/0033<br>200/11 TC |
| 6,188,030 | B1 * | 2/2001 | Livers, Jr. | H01H 43/125<br>74/3.52 |
| 7,268,307 | B2 * | 9/2007 | Soldo | F16K 37/0008<br>200/18 |
| 2005/0184265 | A1 | 8/2005 | Aoki et al. | |
| 2017/0330711 | A1 | 11/2017 | Barenghi et al. | |

FOREIGN PATENT DOCUMENTS

| | | | |
|---|---|---|---|
| CN | 210 223 806 | U | 3/2020 |
| JP | H07-42890 | U | 8/1995 |

OTHER PUBLICATIONS

Discrete Valve Controllers for On/Off Valves, pp. 1-32, Emerson.
GP Series: Valve Monitoring Products, Guardbox Protection GP series limit switch box, Eisenbau.
TopWorx TX-Series Valve Controllers: Installation, Operation & Maintenance Manual, Emerson ES-01956-1 R19.
Rotork®: Soldo Controls, Limit Switch Boxes, PUB109-003-00 (Jun. 2020).

* cited by examiner

TRANSMISSION ASSEMBLY FOR SWITCHBOX

FIELD OF DISCLOSURE

The present disclosure is related to a switchbox, and more particularly, to an actuation mechanism for a valve controller or switchbox with switches.

BACKGROUND

Control valves are used in process control systems to control conditions such as flow, pressure, temperature, and/or liquid level by fully or partially opening or closing in response to a signal received from one or more valve controllers in the system. Typically, a valve controller is operatively coupled to or includes one or more sensors or switches disposed within the system, thereby allowing the valve controller to compare one or more "set points" to a corresponding "process variable" whose value is provided by the switches or sensors. The opening or closing of control valves is typically done automatically by electrical, hydraulic, or pneumatic actuators. In addition, positioners may be used to control the opening or closing of the actuator based on, for example, electric or pneumatic signals received from the valve controller.

Switches, which may be electrically, magnetically (e.g., proximity switches), or mechanically operated (e.g., limit switches), are commonly used for position indication in valve controllers. Typically, a magnetic proximity switch assembly includes a target and a proximity switch, with the proximity switch including a switching circuit. The switching circuit may include an element, such as a lever, that is biased in a first position by a permanent magnet contained in the housing of the proximity switch. With the lever in this first position, the proximity switch is maintained in a first state, in which, for example, a normally closed contact makes contact with a common contact. When the target passes within a predetermined range of the proximity switch, the magnetic flux generated by the target magnet causes the lever of the switching circuit to change bias from the first state to a second state, in which, for example, a normally open contact makes contact with the common contact. In a mechanically operated limit switch, the target can be a cam that physically contacts the limit switch to change operating states.

In some applications, one or more cams and one or more switches may be disposed within an enclosure to protect the switches from damage. This configuration is common when the switch assembly is used in hazardous environments, such as nuclear, oil, gas, pharmaceutical, chemical, and general processing or waste water applications. In such applications, the enclosure is intended to withstand the high temperatures and pressures that occur during a containment accident or a LOCA (loss of coolant accident) at a nuclear facility. Moreover, due to loads that may occur during a seismic event, components such as the switch and/or an assembly that secures the target to a shaft must be adequately secured within the enclosure to prevent unintended displacement that may occur as a result of the seismic loads.

FIGS. 1 and 2 illustrates a known switchbox 10 disposed within a switch box enclosure 12 and operatively coupled to an actuator, such as a rotary actuator (not shown), having a shaft 16. Typically, the shaft 16 is vertically disposed within the enclosure 12 and supports one or more cams 18, 20 as the cams 18, 20 rotate with the shaft 16 relative to the stationary switches 22, 24. Typically, a bottom portion of the extends through a bottom aperture of the switch box 12 and is typically coupled to a valve element, such as the rotating stem of a control valve. The rotation of the stem can be detected when the valve rotates the shaft 16, and thereby rotates the cams 18, 20, within a predetermined range of the switches 22, 24 disposed within the enclosure 12, thereby indicating the control valve is in a particular position. Alternatively, the rotating stem of the control valve may move the cams 18, 20 out of a predetermined range of the switches 18, 20, thereby indicating the control valve has moved from a particular position. To set the switchbox assembly 10 to trigger at a certain point of rotation of the actuator, the actuator, and thus the shaft 16, is rotated to that desired point. When the shaft 16 rotates, the cams 18, 20 rotate to move the cams 18, 20 into close proximity or in contact of the switches 22, 24. When each of the cams 18, 20 trigger one or more of the switches 22 and 24 (e.g., comes within a predetermined activation area for proximity switches, or mechanically contacts the limit switches, one or more of the switches 22, 24 changes states.

As shown in FIGS. 1 and 2, the first and second cams 18, 20 are stacked on top of each other and are arranged to trigger the first and second switches 22, 24 at different points of valve rotation. The switches 22, 24 are disposed as similar heights to the corresponding cams 18, 20.

SUMMARY

A valve controller or switchbox of the present disclosure permits a cam sub-assembly to activate or trigger, either magnetically, mechanically, or by other means, two or more separate switches of a switch plate as a control valve, which is connected to the valve controller, rotates a predetermined number of degrees about a rotational axis.

In accordance with a first aspect, a switchbox or valve controller may include a housing defining an interior volume and a transmission assembly at least partially disposed in the interior volume of the housing. The transmission assembly may include a shaft coupled to a cam sub-assembly. The cam sub-assembly may include a first side and a second side opposite the first side, a first cam and a second cam coupled to the first cam. Each of the first and second cams may include a bore arranged to receive the shaft and a lobe. The lobe of the first cam and the lobe of the second cam may be at least partially coplanar. A first switch and a second switch may be disposed in the interior volume of the housing and may be adjacent to the transmission assembly. The lobe of the first cam may be arranged to activate the first switch and the lobe of the second cam may be arranged to activate the second switch.

In accordance with a second aspect, a transmission assembly of a switchbox or valve controller may include a shaft and a first cam including a first surface, a second surface opposite the first surface, a bore connecting the first and second surfaces, and a lobe. The shaft may be disposed through the bore of the first cam. A second cam may include a first surface, a second surface opposite the first surface, a bore connecting the first and second surfaces, and a lobe. The shaft may be disposed through the bore of the second cam. When the first surface of the first cam engages the first surface of the second cam, a portion of the lobe of the first cam may be coplanar with a portion of the lobe of the second cam.

In accordance with a third aspect, a method of assembling a transmission assembly for use with a switchbox or valve controller may include disposing a shaft through a cam sub-assembly including a first cam and a second cam, and through a bore of a locking member. The cam sub-assembly may include a first side and a second side opposite the first side. A first surface of the locking member may face the first side of the cam sub-assembly. The method may include placing a spring between the second side of the cam sub-assembly and a hub. The hub may be operatively coupled to the shaft. The method may further include disengaging the first surface of the locking member from the first side of the cam sub-assembly. The method may include moving the first and second cams from an initial position into a first position relative to the shaft. The method may further include engaging the first side of the cam sub-assembly with the first surface of the locking member.

In further accordance with any one of the first, second, or third aspects, a switchbox or valve controller, transmission assembly, and/or a method of assembling a transmission assembly for use with a switchbox or valve controller may include any one or more of the following forms.

In one form, a first surface of the first cam may engage a first surface of the second cam.

In some forms, the transmission assembly may include a locking member operatively coupled to the first side of the cam sub-assembly and the shaft such that the cam-sub assembly does not rotate relative to the shaft when the locking member engages the first side of the cam sub-assembly.

In another form, the locking member may include a mating surface arranged to connect with a corresponding mating portion of the first side of the cam sub-assembly.

In these and other examples, the mating surface of the locking member may grip the corresponding mating portion of the cam sub-assembly by friction.

In some forms, the locking member may include a non-circular bore sized to receive a non-circular portion of the shaft.

In an alternative form, the locking member may include a circular bore and a collar arranged to securely couple the locking member to the shaft.

In some examples, the transmission assembly may include a biasing member and a hub.

In some forms, the biasing member may be disposed between the second side of the cam sub-assembly and the hub to apply a biasing force to the cam sub-assembly.

In some forms, a position of the first cam may be adjustable relative to a position of the second cam.

In one form, the lobe of the first cam may include a curved wall protruding from the first surface.

In many forms, a locking member may be coupled to the first cam and may be coupled to the shaft such that the first cam does not rotate relative to the second cam.

In another form, the mating surface of the locking member may engage the mating portion of the second surface of the first cam by friction.

In some forms, the method may include moving the second cam away from the first cam by disengaging a first mating surface of the first cam from a first mating surface of the second cam.

In another form, moving the second cam may include rotating the second cam relative to the first cam from the first position to the second position.

In another form, the method may include engaging the first surface of the second cam with the first surface of the first cam such that the first cam is in the first position and the second cam is in the second position.

DETAILED DESCRIPTION

Figure 3:
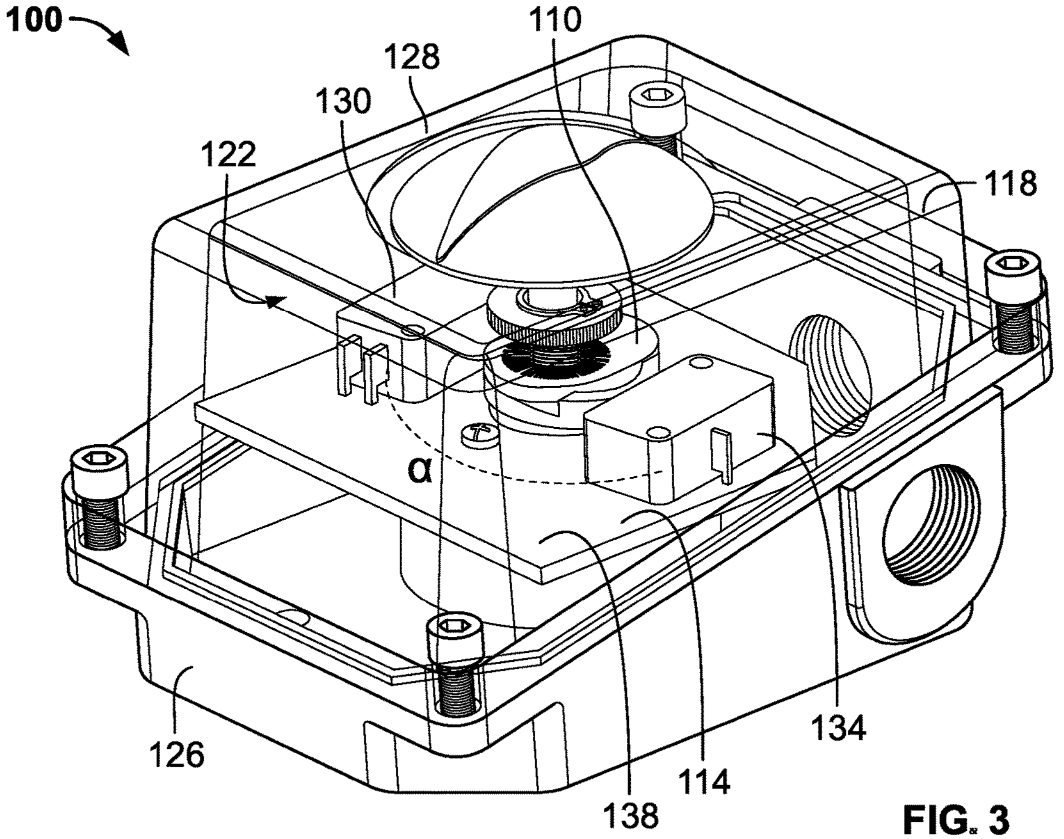
FIG. 3 is an exemplary switchbox and transmission assembly assembled in accordance with the teachings of the present disclosure, with the valve controller taking the form of a switchbox.
Figure 4:
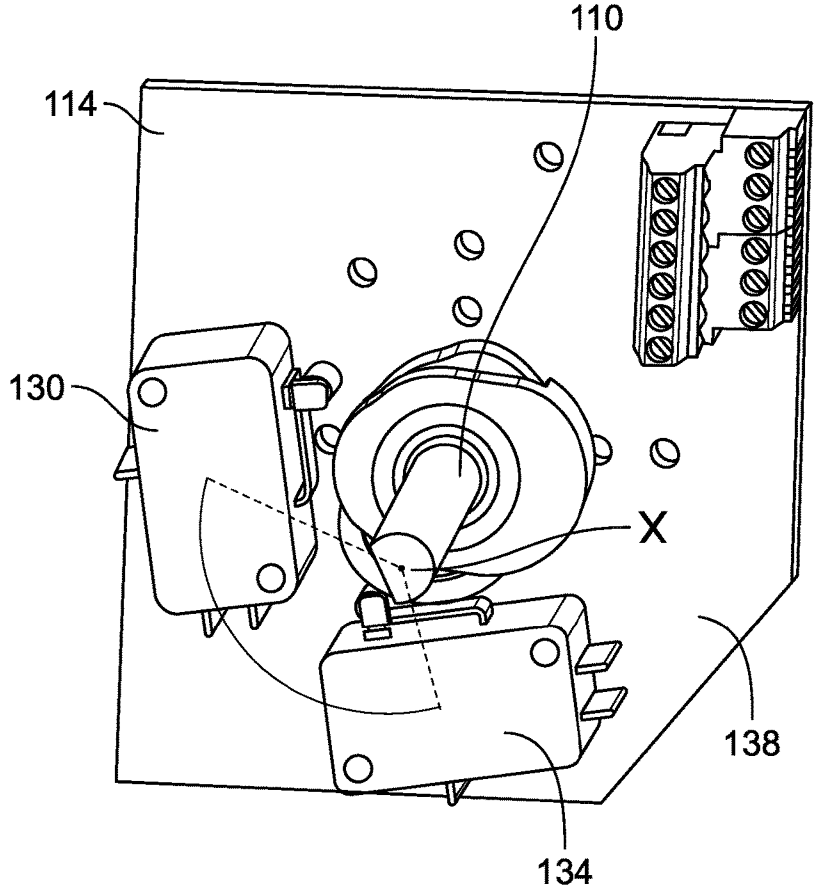
FIG. 4 is a top, interior view of the switchbox of FIG. 3.

FIGS. 3 and 4 illustrate a valve controller 100 with a compact transmission assembly 110 and corresponding switch plate 114 and is constructed in accordance with the teachings of the present disclosure. In this example, the valve controller 100 is a switchbox, though in other examples, a different type of valve controller can be employed.

In FIG. 3, the switchbox 100 includes a housing 118 defining an interior volume 122 containing the interior components of the switchbox 100. The housing 118 is a sealed enclosure that protects the transmission assembly 110 and switch plate 114 from damage and external elements. The housing 118 includes a bottom portion 126 arranged to mount to an actuator of a control valve, for example, and includes an aperture (not shown) to allow for the transmission assembly 110 to operatively couple to an actuator shaft or valve shaft of the control valve. The top portion 128 of the housing is sealed to the bottom portion 126 using a plurality of fasteners and may be transparent to permit visibility of the interior components.

As shown in FIGS. 3 and 4, the switch plate 114 includes first and second switches 130, 134 attached to a mounting surface 138, which may be a plate or a printed circuit board assembly. The mounting surface 138 includes a central aperture (hidden from view) that is sized to receive at least part of the transmission assembly 110. The first and second switches 130, 134 are disposed adjacent to the transmission assembly 110 and are enclosed within the interior volume 122 of the housing 118. The first and second switches 130, 134 are placed at an angle α relative to each other and relative to a rotational axis X of the transmission assembly 110. In FIG. 3, the first and second switches 130, 134 are placed approximately 180 degrees relative to each other about the rotational axis X of the transmission assembly 110. In a different configuration shown in FIG. 4, the first and second switches 130, 134 are placed approximately 90 degrees relative to each other about the rotational axis X of the transmission assembly 110. In other examples, the configuration of switch location may be determined based on angle of desired rotation. The first and second switches 130, 134 may be proximity switches, triggered magnetically, or they may be limit switches, triggered mechanically.

Figure 1:
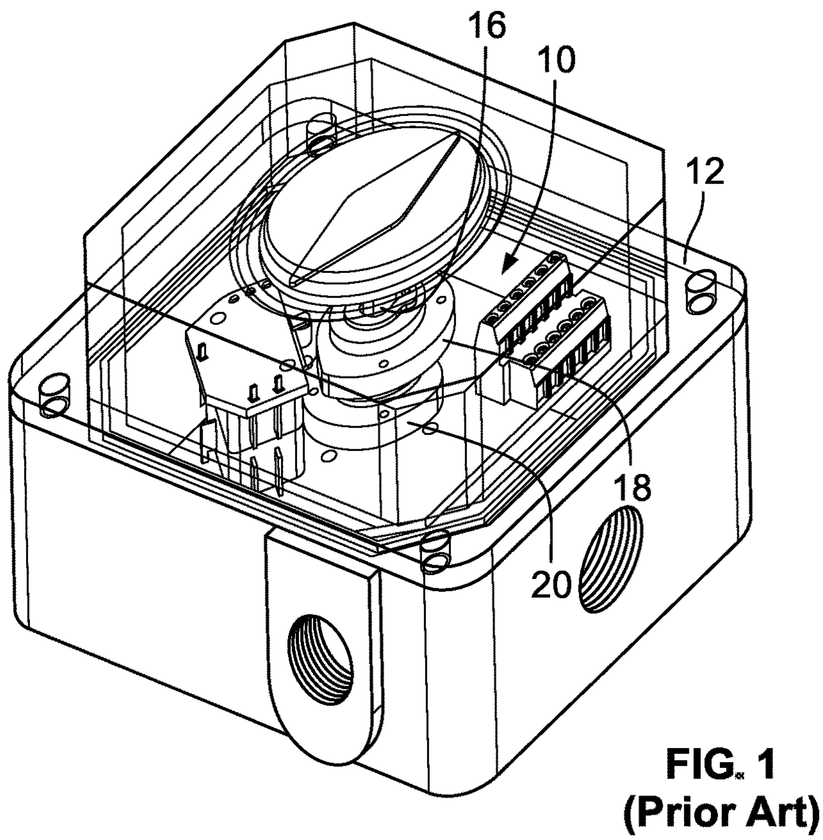
FIG. 1 (Prior Art)
FIG. 1 is a conventional switchbox.
Figure 2:
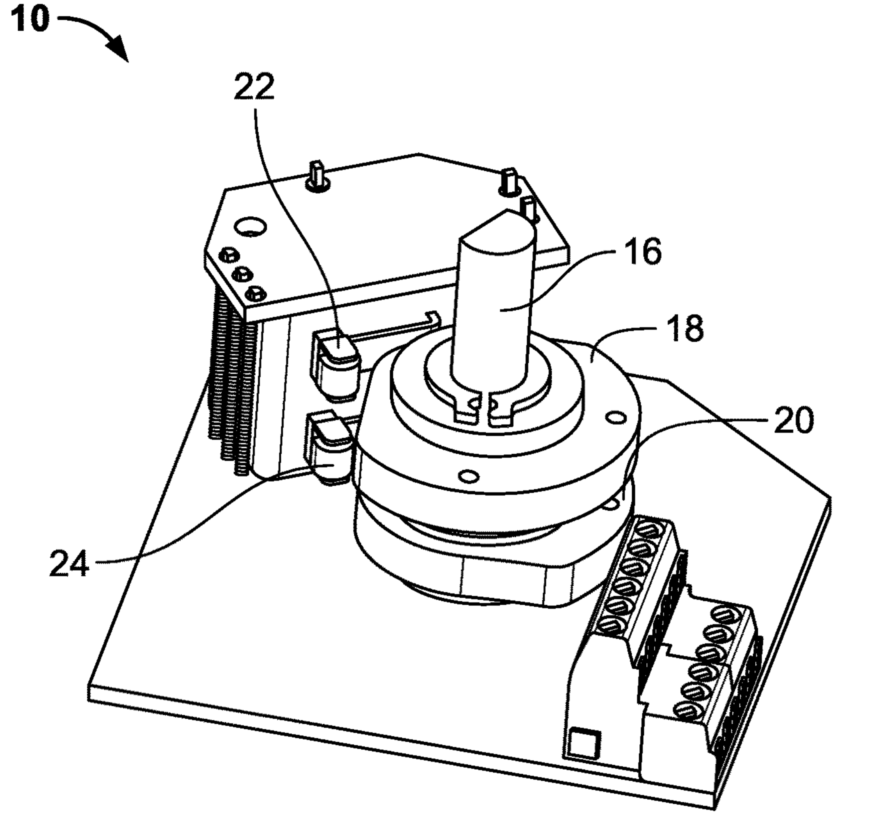
FIG. 2 (Prior Art)
FIG. 2 is an interior view of the switchbox of FIG. 1.

However, different angular placement of the switches 130, 134 and of the corresponding cams of the transmission assembly 110 are possible. The switches 130, 134 are disposed relative to one another at angle α that is greater than zero degrees, and their placement may depend on the physical restraints of each switch 130, 134 so that the switches 130, 134 are mounted on the same plane. In one version, the angle α can be between 1 degree and 180 degrees, between 10 degrees and 180 degrees, between 20 degrees and 180 degrees, between 45 degrees and 180 degrees, or any other suitable angle. Placement of the switches 130, 134 may vary depending on the configuration of the rotational assembly 110 and/or other switches mounted to the plate 138. For example, in another exemplary arrangement, at least two additional switches may be mounted to the mounting surface 138 and placed about the transmission assembly 110. Unlike the arrangement of the switches 22, 24 of the switch box 10 in FIGS. 1 and 2, the first and second switches 130, 134 of FIGS. 3 and 4 are not stacked and instead are mounted to the same plane perpendicular to the shaft 142, which in this case is the mounting surface 138. However, in other examples, one or more switches may be stacked in arrangements having more than two cams.

Figure 5:
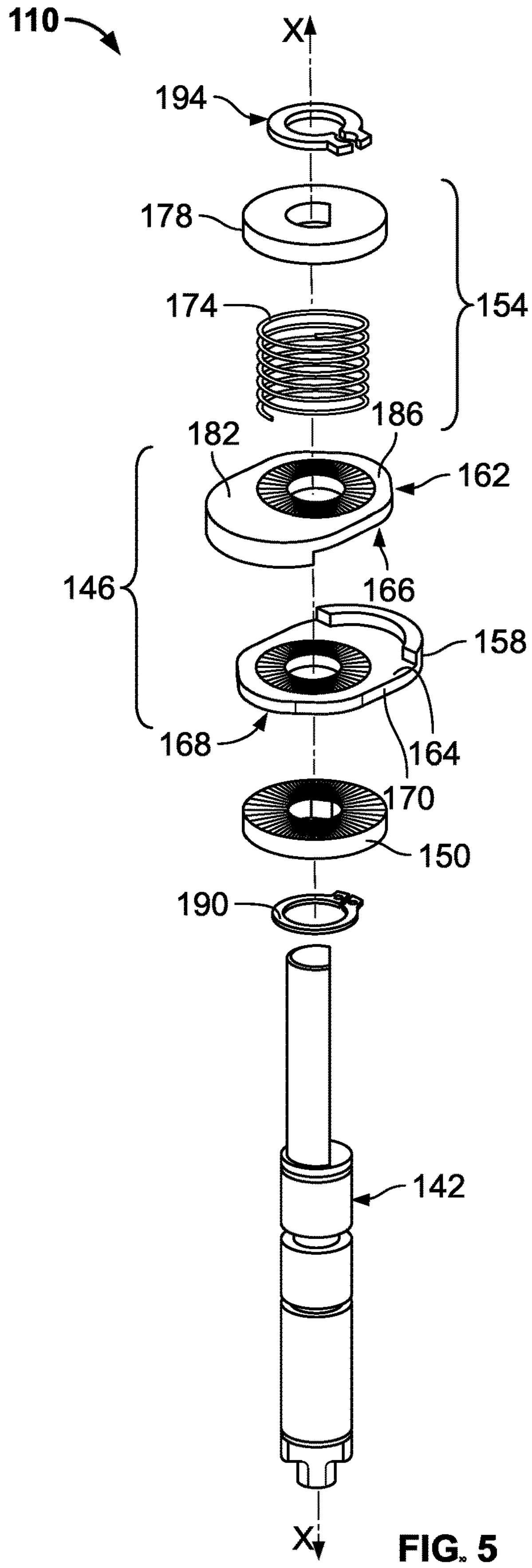
FIG. 5 is an exploded perspective view of the transmission assembly of FIG. 3.

In FIG. 5, the transmission assembly 110 includes a shaft 142, a cam sub-assembly 146, a locking member 150, and an adjustment sub-assembly 154. The cam sub-assembly 146 includes a first cam 158 and a second cam 162 that have corresponding first mating surfaces 164, 166, respectively, that engage when the first and second cams 158, 162 connect. Each of the mating surfaces 164, 166 includes textured mating portion that allows the cams to separate in an axial direction, yet inhibit the cams 158, 162 from rotating relative to one another when the surfaces 164, 166 are engaged. The number of cams of the sub-assembly 146 corresponds to the number of switches on the switch plate 114, and in this example, first and second cams 158, 162 correspond to first and second switches 130, 134. The locking member 150 engages a first side 168 of the cam sub-assembly 146, and more particularly, a second surface 170 of the first cam 158 opposite the first mating surface 164, to secure the cam sub-assembly 146 to the shaft 142. As will be described in further detail below, the locking member 150 operatively couples the cam sub-assembly 146 to the shaft such 142 that the cam sub-assembly 146 rotates with the shaft 142 during operation of the connected valve.

The adjustment sub-assembly 154 is also coupled to the shaft 142 and works with the cam sub-assembly 146 to allow for adjustment of the angular placement of the cams 158, 162 relative to one another. The adjustment sub-assembly 154 includes a spring 174 and a hub 178. The spring 174 and the hub 178 work together to engage a second side 182 of the cam sub-assembly 146, opposite the first side 168 of the cam sub-assembly 146. More particularly, the adjustment sub-assembly 154 engages a second surface 186 of the second cam 162 (opposite the first mating surface 166) to apply a force to the cam assembly 146 to keep the cams 158, 162 together and engaged when the transmission assembly 110 is fully assembled. The spring 174 in the illustrated example is a coil spring, but may be a different type of spring, flexible member, pump, magnetic device with opposing poles, push-button style clamp, or other force generating means capable of applying a force to the second side 182 of the cam sub-assembly 146. As will be described in further detail below, the spring 174 permits adjustment of the cam sub-assembly 146, and the angular placement of each cam 158, 162 relative to one another. Finally, in the illustrated example, the transmission assembly 110 includes first and second snap rings 190, 194 for securing the cam sub-assembly 146, the locking member 150, and the adjustment sub-assembly 154 of the transmission assembly 110 to the shaft 142. Each of the snap rings 190, 194 may snap into corresponding grooves formed in the body of the shaft 142. In other arrangements, however, the transmission assembly 110 may not include one or more of the first and second snap rings 190, 194, depending on how the locking member 150 is secured to the shaft 142.

So configured, when the transmission assembly 110 is fully assembled and each cam is set it in place, the switchbox 100 of the present disclosure permits the cams 158, 162 to activate or trigger, either magnetically or mechanically, two separate switches 130, 134 as the control valve rotates between 0 to 90 degrees about the rotational axis X.

Figure 6:
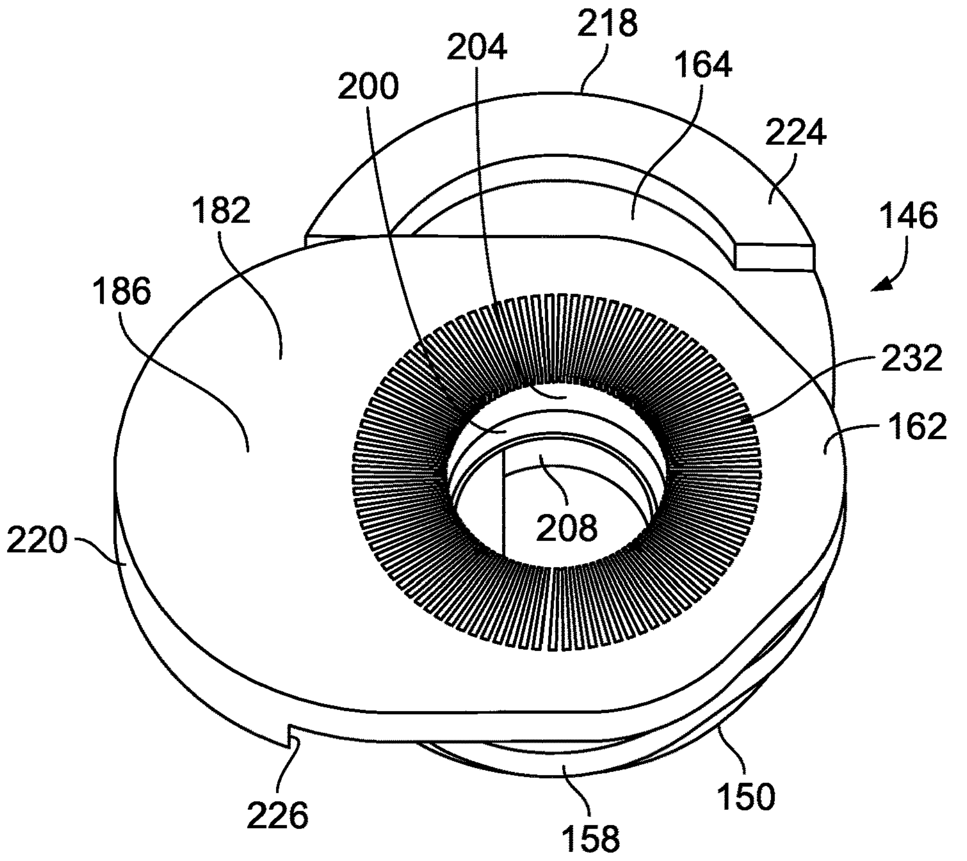
FIG. 6 is a top perspective view of a first exemplary cam sub-assembly and locking member of the transmission assembly of FIG. 3.
Figure 7:
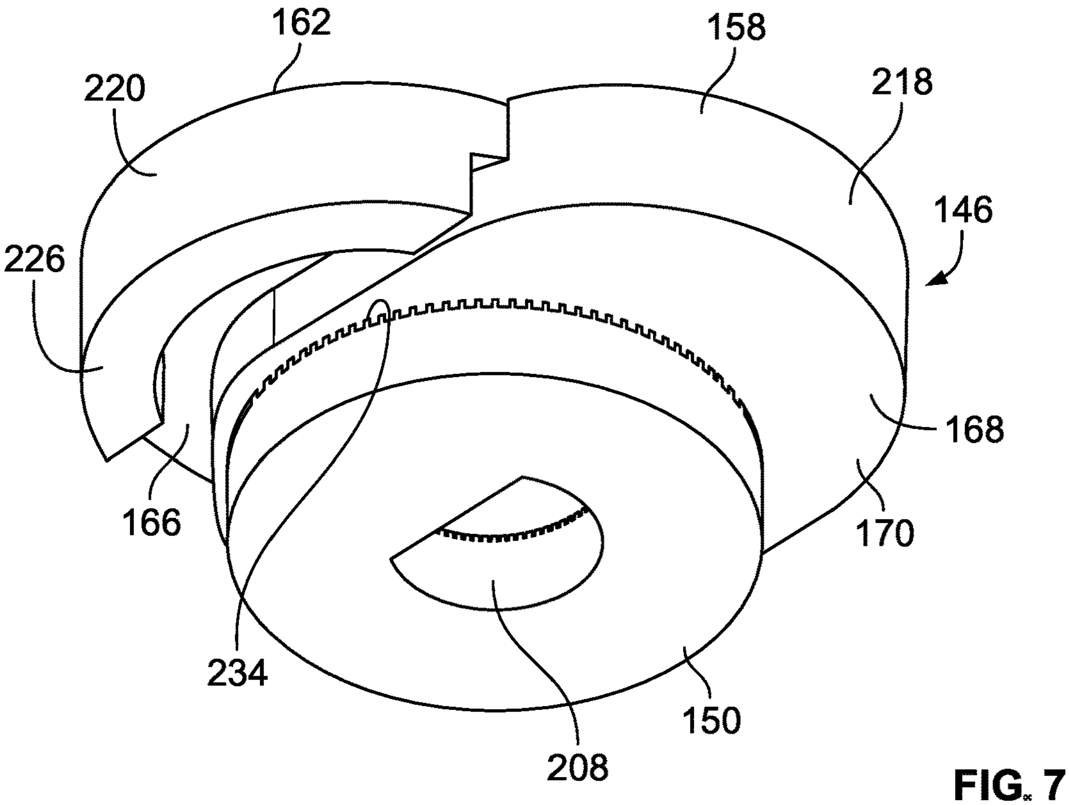
FIG. 7 is a bottom perspective view of the cam sub-assembly and locking member of FIG. 6.

In FIGS. 6 and 7, the two-cam sub-assembly 146 is operatively coupled with the locking member 150 to move as a unit. Each of the first and second cams 158, 162 and the locking member 150 includes a bore 200, 204, 208, respectively, that is arranged to receive the shaft 142. In the illustrated example, each bore 200, 204 of the first and second cams 158, 162 is circular whereas the bore 208 of the locking member 150 is not circular, and is instead shaped to receive a non-circular portion of the shaft 142. As such, each of the cams 158, 162 may rotate relative to the rotational axis X of the shaft 142, when disengaged from the locking member. Whereas, the locking member 150 does not rotate relative to the shaft 142 when the locking member 150 is coupled to the shaft 142.

Figure 8:
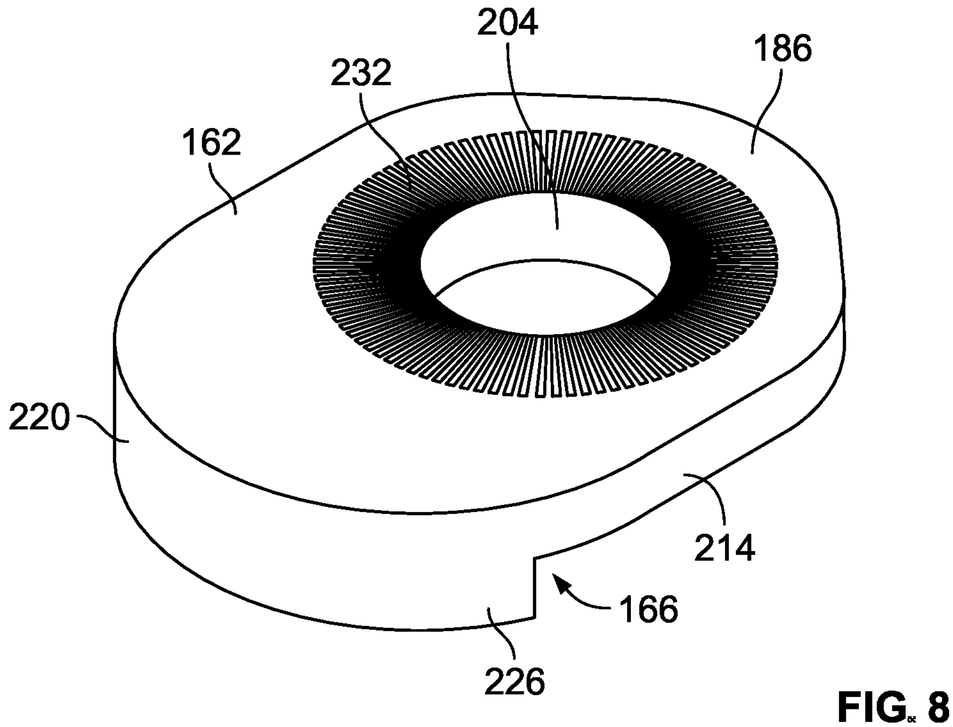
FIG. 8 is a top perspective view of a cam of the cam sub-assembly of FIG. 6.
Figure 9:
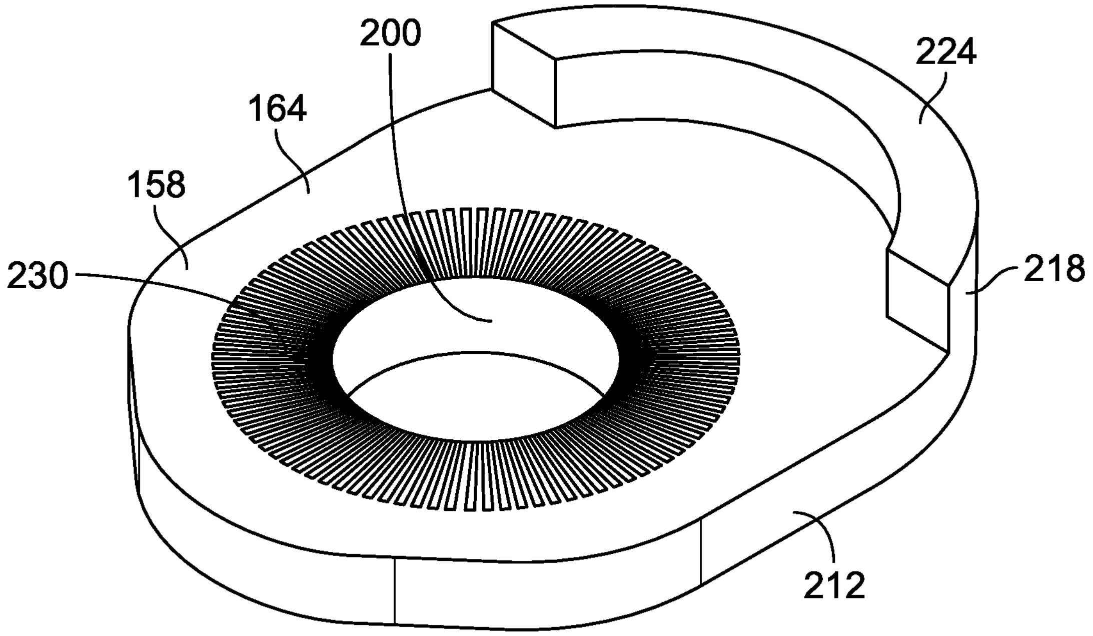
FIG. 9 is a top perspective view of a cam of the cam sub-assembly of FIG. 6.

Turning to FIGS. 8 and 9, each cam 158, 162 of the cam sub-assembly 146 includes a body 212, 214 defining the bore 200, 204, the first mating surface 164, 166, the second surface 170, 186, a target member or lobe 218, 220, and a lip 224, 226 extending from the first mating surface 164, 166, respectively. In the illustrated example, the first and second cams 158, 162 are identical. As such, the features of the first cam 158 in FIG. 9 apply equally to the second cam 162, and the features of the second cam 162 in FIG. 8 apply equally to the first cam 158. However, in other examples, the first and second cams 158, 162 may be different. In one such example, the second cam 162 may not have a textured mating surface on the second surface 186, and/or the shape of the lobe 220 may be different.

In FIG. 9 of the first cam 158, a textured gripping portion 230 of the first mating surface 164 is a circular area that surrounds the bore 200. The textured portion 230 includes a plurality of radial splines or ridges and grooves that serve to grip an adjacent mating surface of a different cam. The illustrated textured gripping portion 230 is circular to match a corresponding circular mating gripping portion of the second cam 162. In other examples, however, the gripping portion 230 may cover other areas of the first surface 164 of the cam 158. For example, the gripping portion 130 may include a pattern of spaced-apart gripping areas or may be a continuous gripping portion of a different shape around the bore 200 of the cam 162. The textured surface is arranged so that when the textured portions 230 of two cams 158, 162 are engaged, the mating surfaces 164, 166 inhibit rotational movement between the first and second cams 158, 162. While the illustrated example includes radial splines, the gripping surface may include other gripping features that achieve the same objective, for example, lock and hook mating features, dimples, snaps, non-radial splines, etc. It will also be appreciated that the mating surface 164 and gripping portion 230 of the first cam 158 applies equally to the mating gripping portion 232 of the second cam 162 in FIG. 8. However, in other examples, the gripping portion 232 on the second surface 186 may be different than the gripping portion on the first surface 166 of the second cam 162.

It will be also appreciated that FIG. 8, which illustrates the second cam 162, also represents the mating feature of the second surface 170 of the first cam 158. The mating feature of the second surface 170 of the first cam 158 is arranged to frictionally engage with a similar mating feature of the locking member 150 so that the first cam 158 is locked relative to the shaft 142 when engaged with the locking member 150. So configured, when the locking member 150 engages the first side 168 of the cam sub-assembly 146, which is the second surface 170 of the first cam 158 in this example, the first cam 158 is also locked relative to the shaft 142 and does not rotate about the X axis. Further, when the first mating surfaces 164, 166 of the first and second cams engage 158, 162, the cams 158, 162 couple so that the cam sub-assembly 146 moves together as a unit. As such, the second cam 162 does not rotate relative to the first cam 158, locking member 150, or about the X axis when the transmission assembly 110 is fully assembled.

As shown in FIGS. 8 and 9, each lobe 218, 220 of the respective first and second cams 158, 162 extends outwardly relative to one area of the bore 200, 204. Each lip 224, 226 of the first and second cams 158, 162 extends in a perpendicular direction relative to the mating surface 164, 164 of its respective cam 158, 162 and defines an outer edge of the lobe 218, 220. The lips 224, 226 overlap such that the outer edges are positioned to activate the switches 130, 134. The lobe 218, 220 of each cam 158, 162, however, may have a different shape while still performing the same or similar objective. For example, instead of the rounded lobe structure, the lobes 218, 220 may include a pointed protruding element or other structure integrated or attached to the body of the cam. The alternative lobe shape may depend on the type of switch and/or where the switches 130, 134 are located on the switch plate 114. The shape of the cam may also change the way or duration of the activation of the switch 134, 138.

As shown in FIGS. 6 and 7, the lip 224, 226 of each cam 158, 162 is arranged to hang over or overlap with a portion of the body 212, 214 of the adjacent cam 158, 162. The location and extension of the lip 224, 226 of each cam 158, 162 permits a reduced overall thickness of the cam sub-assembly 146 while reaching a particular height to trigger the switches 130, 134. As shown in FIGS. 6 and 7, the lobe 218 of the first cam 158 and the lobe 220 of the second cam 162 are at least partially coplanar when the first mating surfaces 164, 166 engage. In other words, a portion of the lip 224 of the first cam 158 is coplanar with the second surface 186 of the second cam 162, and a portion of the lip 226 of the second cam 162 is coplanar with the second surface 170 of the first cam 158. Because of the arrangement of the lip and lobe portions of the cams 158, 162, each cam 158, 162 can rotate 180 degrees relative to the other cam 162, 158 for a wide range of motion when setting the cam sub-assembly 146. So configured, as the transmission assembly 110 rotates with the control valve, the lobe 218, 220 of each cam 158, 162 swings in proximity to the switches 130, 134, the cam 158, 162 and triggers a lever on the switch, either simultaneously or consecutively with the other cam and switch.

As shown in FIGS. 3, 4, and 6 and 7, the lobes 218, 220 are disposed at different positions about the rotational axis X of the shaft 142 such that each cam lobe 218, 220 can trigger a different switch 130, 134 depending on the rotational movement of the shaft 142. In one example, the lobe 218 of the first cam 158 is arranged to activate the first switch 130 and the lobe 220 of the second cam 162 is arranged to activate the second switch 134 when the shaft 142 rotates from 0 to 90 degrees about the X axis.

Figure 10:
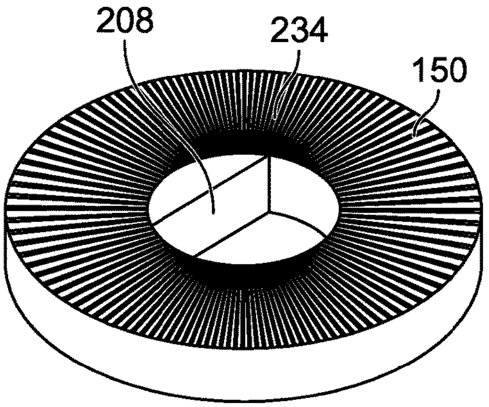
FIG. 10 is a perspective view of the first exemplary locking member of FIGS. 6 and 7.
Figure 11:
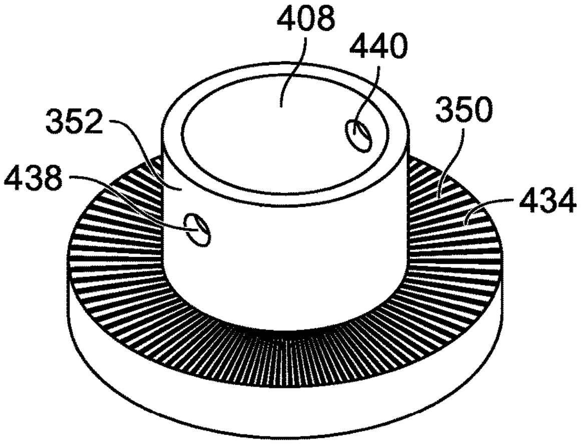
FIG. 11 is a perspective view of a second exemplary locking member assembled in accordance with the teachings of the present disclosure.

Turning now to FIGS. 10 and 11, first and second exemplary locking members 150, 350 for use with the transmission assembly 110 are constructed in accordance with the teachings of the present disclosure. The first exemplary locking member 150 is depicted in FIGS. 6 and 7, and includes a non-circular aperture or bore 208 shaped to receive a non-cylindrical portion of the shaft 142. In the illustrated example, the bore 204 is D-shaped to receive a shaft 142 having a D-shaped cross-section. The locking member 150 includes a first side 234 having a textured surface arranged to grip to the mating feature of the first side 170 of the cam-sub assembly 146. The textured mating surface on the first side 234 is arranged to grip the mating portion on the second surface 170 of the first cam 158 to lock with the cam-sub assembly 146. The mating surface 234 of the locking member 150 locks to the mating portion of the first side 168 of the sub-assembly 146 by friction and may include similar splines, grooves, and ridges as the other mating surfaces of the cams 158, 162. To limit axial movement of the locking member 150 relative to the shaft 142 and cam sub-assembly 146, the locking ring 190 secures the locking member 150 in place by snapping into a groove formed in the shaft 142. However, the locking member 150 may be coupled to the shaft 142 by other means.

Figure 12:
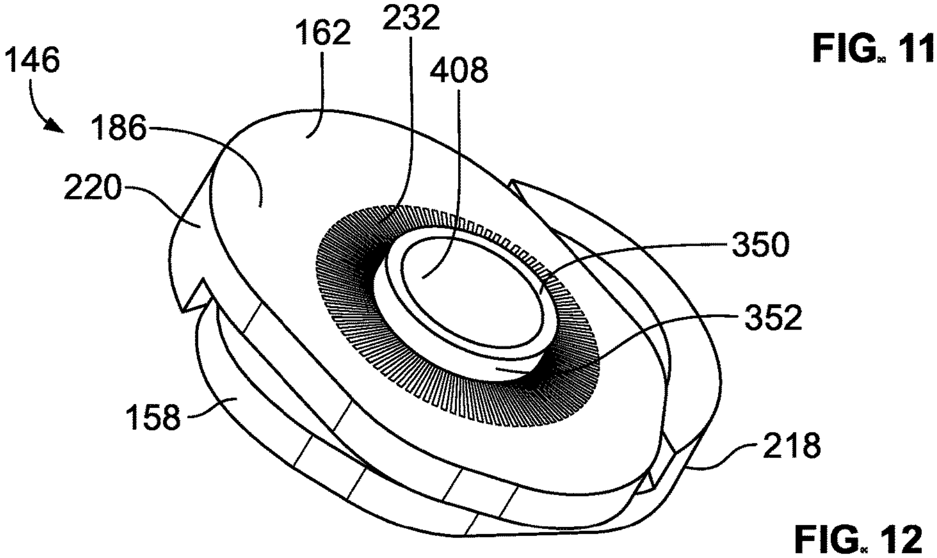
FIG. 12 is a top perspective view of the cam sub-assembly with the locking member of FIG. 11.

In FIG. 11, the second exemplary locking member 350 includes a cylindrical collar 352 defining a cylindrical bore 408 and extending from a first surface 434 of the locking member 350. The collar 352 is arranged to receive a cylindrical portion of the shaft 142. Similar to the first side 234 of the first exemplary locking member 150, the first side 434 of the second locking member 350 also has a textured mating portion to grip a corresponding mating portion of the cam sub-assembly 146. The second exemplary locking member 350 couples to the shaft 142 by a locking pin (not shown) extending through both the shaft 142 and parallel apertures 438, 440 formed in the collar 352. The locking member 350 locks to the shaft 142 when the locking pin extends through both apertures 438, 440 in the collar 352 and a lateral bore formed in the shaft 142. As shown in FIG. 12, the collar 352 extends beyond the second surface 186 of the second cam 162. So configured, each of the locking members 150, 350, once coupled to the shaft 142, do not rotate relative to the shaft 142.

In the illustrated examples, the locking member 150, 350 is coupled to the first side 168 of the cam-sub assembly and the adjustment sub-assembly 154 is coupled to the second side 172 of the cam sub-assembly 146. However, in other examples, transmission assembly 110 may be arranged so that the locking member 150, 350 is coupled to the second side 172 of the cam sub-assembly 146 and the adjustment sub-assembly 154 is coupled to the first side 168 of the cam sub-assembly 146. Also, while the illustrated example includes only two cams 158, 162, another exemplary transmission assembly may include additional stacked cams. In such an example, the first side and the second side of the cam sub-assembly 146 may not correlate with second surfaces 170, 186 of the first and second cams 158, 162, and may instead correlate to second surfaces of other cams.

The transmission assembly 110 of the present disclosure permits a user to adjust the position of each cam 158, 162 relative to the shaft 142 using one hand. A method of adjusting the cams 158, 162 relative to the shaft 142 will be described with respect to FIGS. 13-15, and a method of adjusting the second cam 162 relative to the first cam 158 will be described with respect to FIGS. 16-18.

Figure 15:
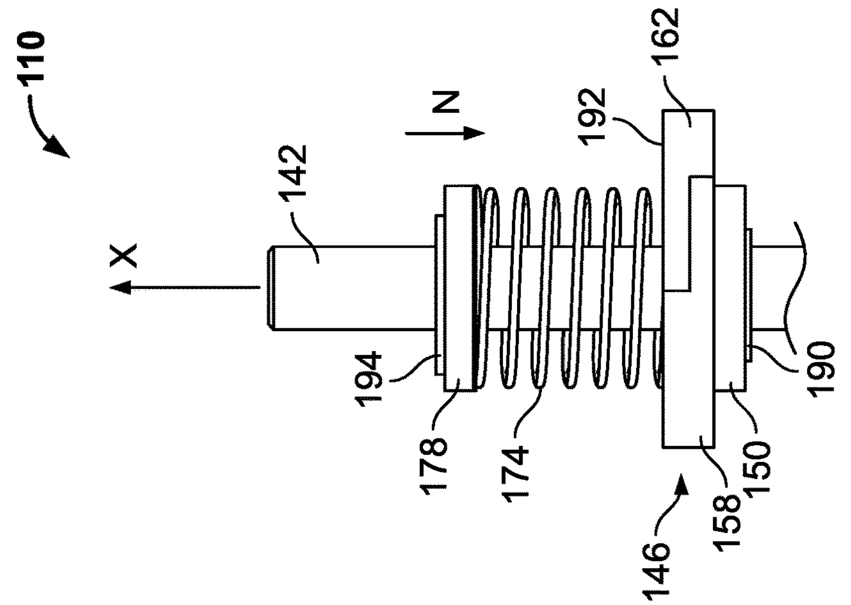
FIGS. 13, 14, and 15 depict various orientations of the transmission assembly of FIG. 3 for adjusting a cam position.
Figure 14:
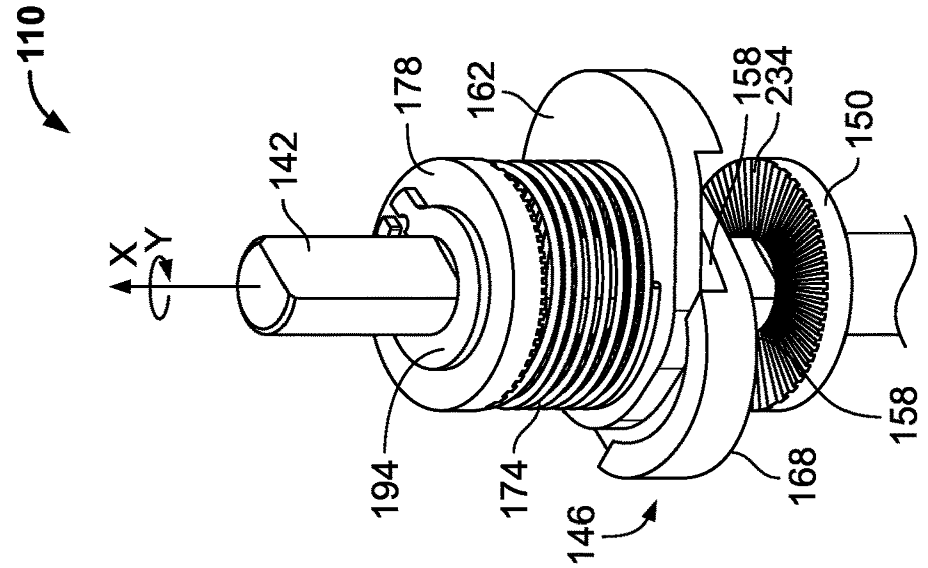
Figure 13:
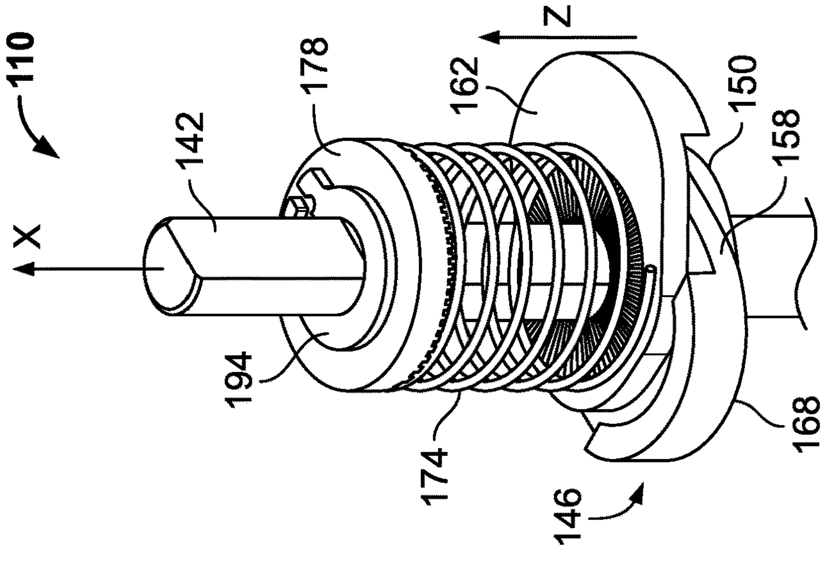

FIG. 13 illustrates an assembled transmission assembly 110 with both first and second locking rings 190, 194 coupled to the shaft 142, and the first and second cams 158, 162 in an initial position. To first adjust the position of the first cam 158, an operator lifts the cam sub-assembly 146 in an axial Z direction along the shaft 142, thereby compressing the spring 174 to disengage the locking member 150 from the first side 168 of the cam sub-assembly 146. In FIG. 14, the cam assembly 146 compresses the spring 174 and the locking member 150 disengages from the cam sub-assembly 146. The operator may then rotate the cam sub-assembly 146 in a Y direction, or a direction opposite the Y direction, about the X axis to position the first and second cams 158, 162 in a first position, different than the initial position. After the first and second cams 158, 162 are placed in the desired first position for the positioning of the first cam 158, the operator may move the cam sub-assembly 146 in a W direction, opposite the Z direction, to engage the sub-assembly 146 with the locking member 150 once again, as shown in FIG. 15. In the first position, the spring 174 expands between the second side 182 of the sub-assembly 146 and the hub 178 to keep the cam-sub assembly 146 engaged with the locking member 150.

Figure 16:
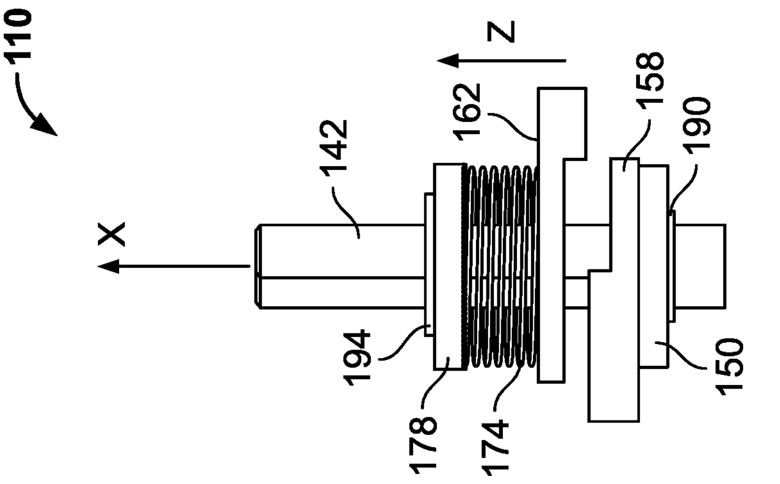
FIGS. 16, 17, and 18 depict various orientations of the transmission assembly of FIG. 3 for adjusting a cam position relative to the other cam.
Figure 17:
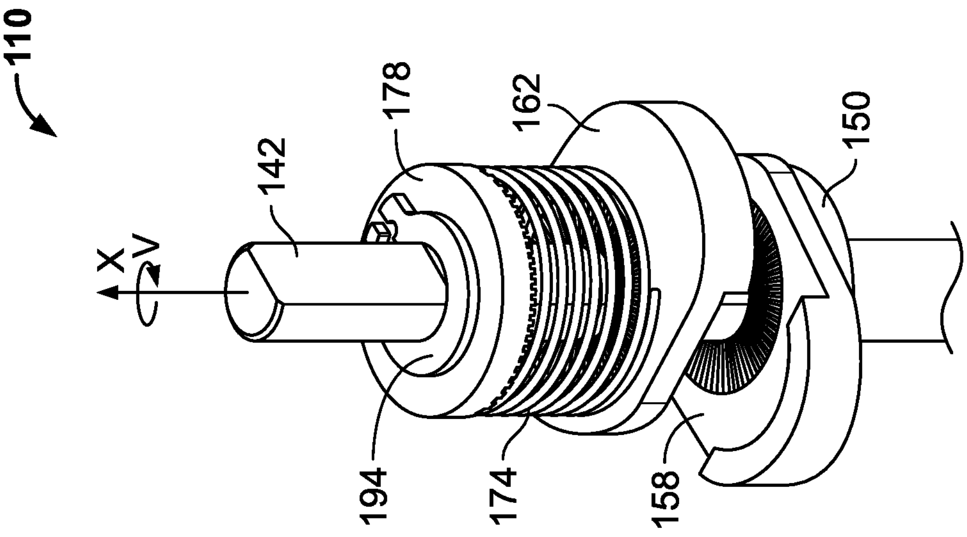
Figure 18:
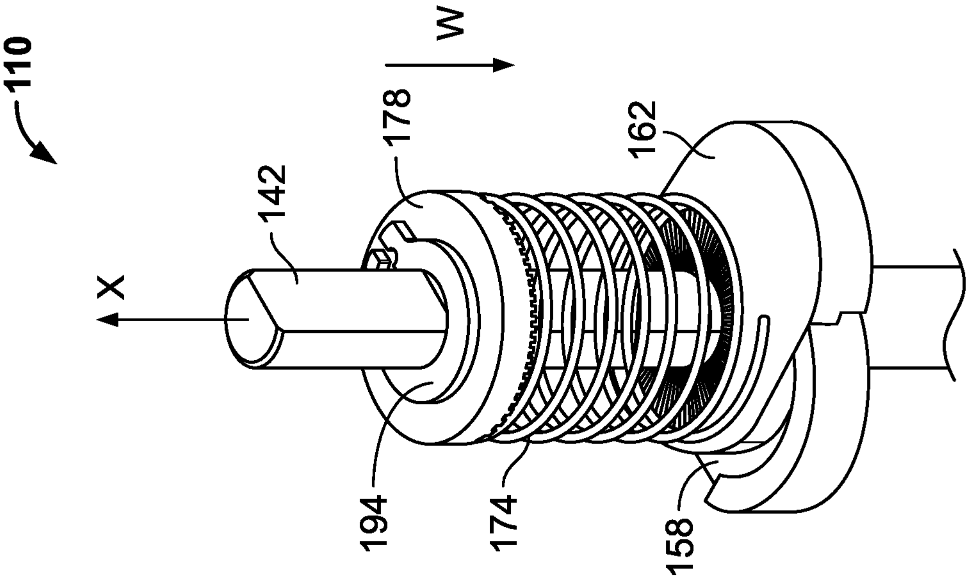

In FIG. 16, the operator may move the second cam 162 in the axial Z direction by lifting the cam 162 along the shaft 142. The first cam 158 remains engaged with the locking member 150 as the first position of the first cam 158 has been previously set. In FIG. 17, the operator may move the second cam 162 relative to the shaft 142 and the first cam 158 by rotating the cam 162 about the X axis in the Y direction, or in a direction opposite the Y direction. After the second cam 162 is in a desired second position shown in FIG. 17, the operator may move the second cam 162 in the axial W direction to engage the second cam 162 with the first cam 158, as shown in FIG. 18. Once again, the cams 158, 162 are set in position relative to the shaft 142, at a desired angle, with the first cam 158 in the first position, and the second cam 162 in the second position.

Figure 19:
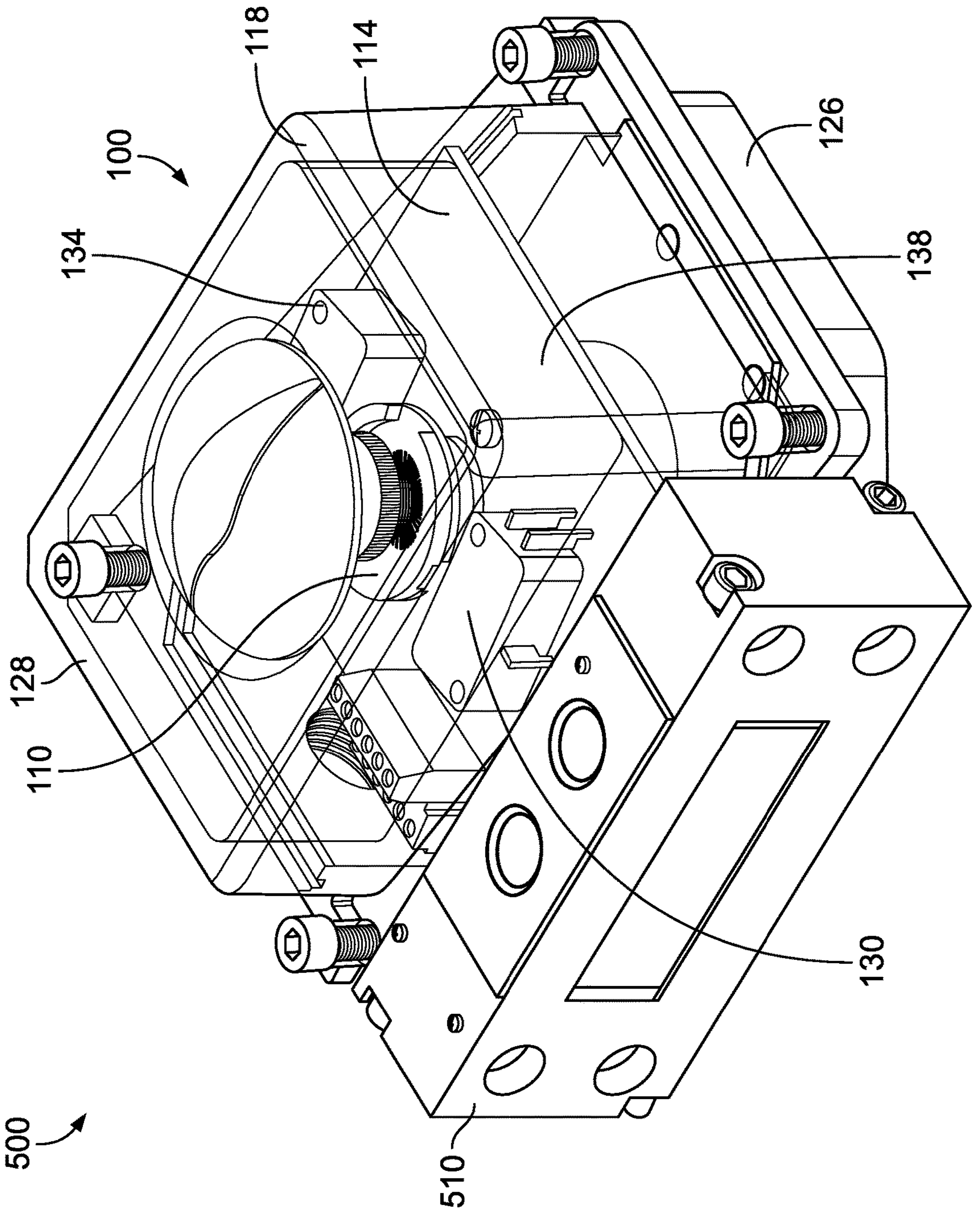
FIG. 19 is a perspective view of an example of a valve controller, in the form of a digital valve controller, coupled to the switchbox housing the transmission assembly of FIG. 3.

FIG. 19 illustrates a digital valve controller 510 incorporating the transmission assembly 110 described herein. The digital valve controller 510 may be arranged to control an attached or coupled actuator and valve. The valve controller 510 may include a valve that is operated with pilot solenoid valves, and the switchbox 100 would provide feedback to the digital valve controller 510 that the actuator is in either a closed or open position.

The transmission assembly 110 of the present disclosure may be used in conjunction with any process control device operated by a linear actuator or a rotary actuator such as, for example, throttle valves, isolation valves, rotary valves, and/or any other process control device. The transmission assembly 110 may be installed in TopWorx Products, D-Series, TX and TV, K-Series, or other models of other switchboxes, and/or valve controllers. The compact design of the transmission assembly 110 reduces the occupied space of the switchbox 100. By comparison to conventional switchboxes, the switchbox 100 of the present disclosure does not necessarily occupy more space with two switches. By overlapping the lip of one cam over the body of the other cam, the transmission assembly 110 can trigger two switches disposed on the same plane, thereby reducing the height needed to house the cams and switches. In contrary to the stacked switches of the prior art, the transmission assembly 110 of the present disclosure can activate two separate switch boxes disposed on the same plane. This configuration facilitates manufacturing, reduces the costs of parts and of assembly, and reduces the overall area needed to house multiple cams and switches of switchboxes or valve controllers.

Another benefit of the disclosed transmission assembly 110 is the ability to adjust the angular placement of the cams relative to one another. The adjustability of the transmission assembly 110 permits single-hand adjustment of the angle between the lobes or target points of the cams. The adjustment assembly 154 may be easily manipulated to adjust the angle between triggering points of the cams, and allows the transmission assembly to change depending on the arrangement of the switches.

Finally, although certain assemblies have been described herein in accordance with the teachings of the present disclosure, the scope of coverage of this patent is not limited thereto. On the contrary, while the disclosed assemblies have been shown and described in connection with various examples, it is apparent that certain changes and modifications, in addition to those mentioned above, may be made. This patent application covers all examples of the teachings of the disclosure that fairly fall within the scope of permissible equivalents. Accordingly, it is the intention to protect all variations and modifications that may occur to one of ordinary skill in the art.

What is claimed:

1. A switchbox comprising:

a housing defining an interior volume;

a transmission assembly at least partially disposed in the interior volume of the housing, the transmission assembly including a shaft coupled to a cam sub-assembly, the cam sub-assembly including a first side and a second side opposite the first side, a first cam and a second cam coupled to the first cam, each of the first and second cams including a bore arranged to receive the shaft and a lobe, the lobe of the first cam and the lobe of the second cam being at least partially coplanar;

a first switch and a second switch disposed in the interior volume of the housing and adjacent to the transmission assembly;

wherein the lobe of the first cam is arranged to activate the first switch and the lobe of the second cam is arranged to activate the second switch; and wherein the transmission assembly includes a locking member operatively coupled to the first side of the cam sub-assembly and the shaft such that the cam-sub assembly does not rotate relative to the shaft when the locking member engages the first side of the cam sub-assembly.

2. The valve controller of claim 1, wherein a first surface of the first cam engages a first surface of the second cam.

3. The valve controller of claim 1, wherein the locking member includes a mating surface arranged to connect with a corresponding mating portion of the first side of the cam sub-assembly.

4. The valve controller of claim 3, wherein the mating surface of the locking member grips the corresponding mating portion of the cam sub-assembly by friction.

5. The valve controller of claim 1, wherein the locking member includes a non-circular bore sized to receive a non-circular portion of the shaft.

6. The valve controller of claim 1, wherein the locking member includes a circular bore and a collar arranged to securely couple the locking member to the shaft.

7. The valve controller of claim 1, wherein the transmission assembly includes a biasing member and a hub, the biasing member disposed between the second side of the cam sub-assembly and the hub to apply a biasing force to the cam sub-assembly.

8. The valve controller of claim 1, wherein a position of the first cam is adjustable relative to a position of the second cam.

9. A transmission assembly of a switchbox, the assembly comprising:
 - a shaft;
 - a first cam including a first surface, a second surface opposite the first surface, a bore connecting the first and second surfaces, and a lobe, the shaft disposed through the bore of the first cam;
 - a second cam including a first surface, a second surface opposite the first surface, a bore connecting the first and second surfaces, and a lobe, the shaft disposed through the bore of the second cam;
 - wherein when the first surface of the first cam engages the first surface of the second cam, a portion of the lobe of the first cam is coplanar with a portion of the lobe of the second cam; and
 - further comprising a locking member coupled to the first cam and coupled to the shaft such that the first cam does not rotate relative to the second cam.

10. The transmission assembly of claim 9, wherein the lobe of the first cam includes a curved wall protruding from the first surface.

11. The transmission assembly of claim 9, wherein the locking member includes a mating surface arranged to connect with a mating portion of the first cam.

12. The transmission assembly of claim 11, wherein the mating surface of the locking member engages the mating portion of the second surface of the first cam by friction.

13. The transmission assembly of claim 9, further comprising a biasing member and a hub, the biasing member disposed between the second cam and the hub to apply a biasing force to the second cam.

14. A method of assembling a transmission assembly for use with a switchbox, the method comprising:
 - disposing a shaft through a cam sub-assembly including a first cam and a second cam, and through a bore of a locking member, the cam sub-assembly including a first side and a second side opposite the first side, wherein a first surface of the locking member faces the first side of the cam sub-assembly;
 - securing the locking member to the shaft via a first lock ring;
 - placing a spring between the second side of the cam sub-assembly and a hub, the hub operatively coupled to the shaft with the shaft extending through the hub and secured to the shaft by a second lock ring with the second lock ring bearing against the hub from above, and with the spring bearing against the hub from below;
 - disengaging the first surface of the locking member from the first side of the cam sub-assembly;
 - moving the first and second cams from an initial position into a first position relative to the shaft;
 - engaging the first side of the cam sub-assembly with the first surface of the locking member.

15. The method of claim 14, wherein moving the first and second cams includes rotating the first cam and second cam from the initial position to the first position.

16. The method of claim 14, further comprising moving the second cam away from the first cam by disengaging a first mating surface of the first cam from a first mating surface of the second cam.

17. The method of claim 16, wherein moving the second cam includes rotating the second cam relative to the first cam from the first position to the second position.

18. The method of claim 17, further comprising engaging the first surface of the second cam with the first surface of the first cam such that the first cam is in the first position and the second cam is in the second position.

* * * * *